United States Patent
Wang et al.

(10) Patent No.: US 12,143,612 B2
(45) Date of Patent: Nov. 12, 2024

(54) CONTEXT-BASED ADAPTIVE BINARY ARITHMETIC CODING DECODER CAPABLE OF DECODING MULTIPLE BINS IN ONE CYCLE AND ASSOCIATED DECODING METHOD

(71) Applicant: MEDIATEK INC., Hsin-Chu (TW)

(72) Inventors: Sheng-Jen Wang, Hsinchu (TW); Chao-I Wu, Hsinchu (TW); Ming-Long Wu, Hsinchu (TW); Chia-Yun Cheng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 10 days.

(21) Appl. No.: 17/855,829

(22) Filed: Jul. 1, 2022

(65) Prior Publication Data
US 2023/0059794 A1 Feb. 23, 2023

Related U.S. Application Data

(60) Provisional application No. 63/235,828, filed on Aug. 23, 2021.

(51) Int. Cl.
*H04N 19/00* (2014.01)
*H04N 19/13* (2014.01)
*H04N 19/423* (2014.01)
*H04N 19/44* (2014.01)

(52) U.S. Cl.
CPC .......... *H04N 19/44* (2014.11); *H04N 19/13* (2014.11); *H04N 19/423* (2014.11)

(58) Field of Classification Search
CPC ....... H04N 19/44; H04N 19/13; H04N 19/423
See application file for complete search history.

(56) References Cited

U.S. PATENT DOCUMENTS

| 7,262,722 | B1* | 8/2007 | Jahanghir | H03M 7/4006 341/67 |
|---|---|---|---|---|
| 2009/0168868 | A1* | 7/2009 | Jahanghir | H04N 19/61 375/E7.126 |
| 2012/0014454 | A1* | 1/2012 | Budagavi | H04N 19/46 375/E7.125 |
| 2013/0272389 | A1* | 10/2013 | Sze | H04N 19/91 375/240.03 |
| 2018/0084265 | A1* | 3/2018 | Lee | H04N 19/13 |

(Continued)

FOREIGN PATENT DOCUMENTS

| CN | 110419216 A | 11/2019 |
|---|---|---|
| CN | 110431748 A | 11/2019 |

*Primary Examiner* — Zhihan Zhou
(74) *Attorney, Agent, or Firm* — Winston Hsu

(57) ABSTRACT

A context-based adaptive binary arithmetic coding (CABAC) decoder includes a bin decode circuit and a context update circuit. The bin decode circuit supports decoding of multiple bins in one cycle. The multiple bins include a first bin and a second bin. The bin decode circuit generates a bin value of the first bin according to a first set of multiple contexts, a first range and a first offset, and generates one bin value of the second bin according to a second set of multiple contexts, a second range and a second offset. The context update circuit updates the first set of multiple contexts in response to the bin value of the first bin, to generate a first set of multiple updated contexts, and updates the second set of multiple contexts in response to said one bin value of the second bin, to generate a second set of multiple updated contexts.

19 Claims, 11 Drawing Sheets

(56) References Cited

U.S. PATENT DOCUMENTS

| | | | |
|---|---|---|---|
| 2018/0091815 A1* | 3/2018 | Banerjee | H04N 19/436 |
| 2018/0192053 A1* | 7/2018 | Zhou | H04N 19/159 |
| 2021/0195196 A1* | 6/2021 | Zheng | H04N 19/42 |
| 2022/0132173 A1* | 4/2022 | Sim | H04N 19/184 |
| 2022/0224915 A1* | 7/2022 | Wang | H04N 19/176 |

* cited by examiner

CONTEXT-BASED ADAPTIVE BINARY ARITHMETIC CODING DECODER CAPABLE OF DECODING MULTIPLE BINS IN ONE CYCLE AND ASSOCIATED DECODING METHOD

CROSS REFERENCE TO RELATED APPLICATIONS

This application claims the benefit of U.S. provisional application No. 63/235,828, filed on Aug. 23, 2021 and incorporated herein by reference.

BACKGROUND

The present invention relates to a video decoder design, and more particularly, to a context-based adaptive binary arithmetic coding (CABAC) decoder capable of decoding multiple bins in one cycle (stage) and an associated decoding method.

The Versatile Video Coding (VVC) standard (also known as H.266 standard) is the most recent video coding standard. The primary objective of the new VVC standard is to provide a significant increase in compression capability compared to its predecessor, the High Efficiency Video Coding (HEVC) standard (also known as H.265 standard). At the same time, VVC includes design features that make it suitable for a broad range of video applications. Like the HEVC standard, the VVC standard also employs context-adaptive binary arithmetic coding (CABAC) technique for entropy encoding syntax elements for coefficients in one transform block. In a conventional CABAC decoder design, the hardware based decoding architecture generally decodes only a single bin in one cycle. Thus, there is a need for an innovative VVC/H.266 CABAC decoder design with improved decoding performance.

SUMMARY

One of the objectives of the claimed invention is to provide a context-based adaptive binary arithmetic coding (CABAC) decoder capable of decoding multiple bins in one cycle (stage) and an associated decoding method. For example, the CABAC decoder may be a multi-bin VVC/H.266 CABAC decoder.

According to a first aspect of the present invention, an exemplary context-based adaptive binary arithmetic coding (CABAC) decoder is disclosed. The exemplary CABAC decoder includes a bin decode circuit and a context update circuit. The bin decode circuit is arranged to at least support decoding of multiple bins in one cycle, wherein the multiple bins comprise a first bin and a second bin, and the bin decode circuit generates a bin value of the first bin according to a first set of multiple contexts, a first range and a first offset, and generates one bin value of the second bin according to a second set of multiple contexts, a second range and a second offset, where each of the second range and the second offset depends on decoding of the first bin. The context update circuit is arranged to update the first set of multiple contexts in response to the bin value of the first bin, to generate a first set of multiple updated contexts; and further arranged to update the second set of multiple contexts in response to said one bin value of the second bin, to generate a second set of multiple updated contexts.

According to a second aspect of the present invention, an exemplary context-based adaptive binary arithmetic coding (CABAC) decoding method is disclosed. The exemplary CABAC decoding method includes: performing, by a bin decode circuit, decoding of multiple bins in one cycle, wherein the multiple bins comprise a first bin and a second bin, and a bin value of the first bin is decoded according to a first set of multiple contexts, a first range and a first offset, and one bin value of the second bin is decoded according to a second set of multiple contexts, a second range and a second offset, where each of the second range and the second offset depends on decoding of the first bin; updating the first set of multiple contexts in response to the bin value of the first bin, to generate a first set of multiple updated contexts; and updating the second set of multiple contexts in response to the bin value of the second bin, to generate a second set of multiple updated contexts.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
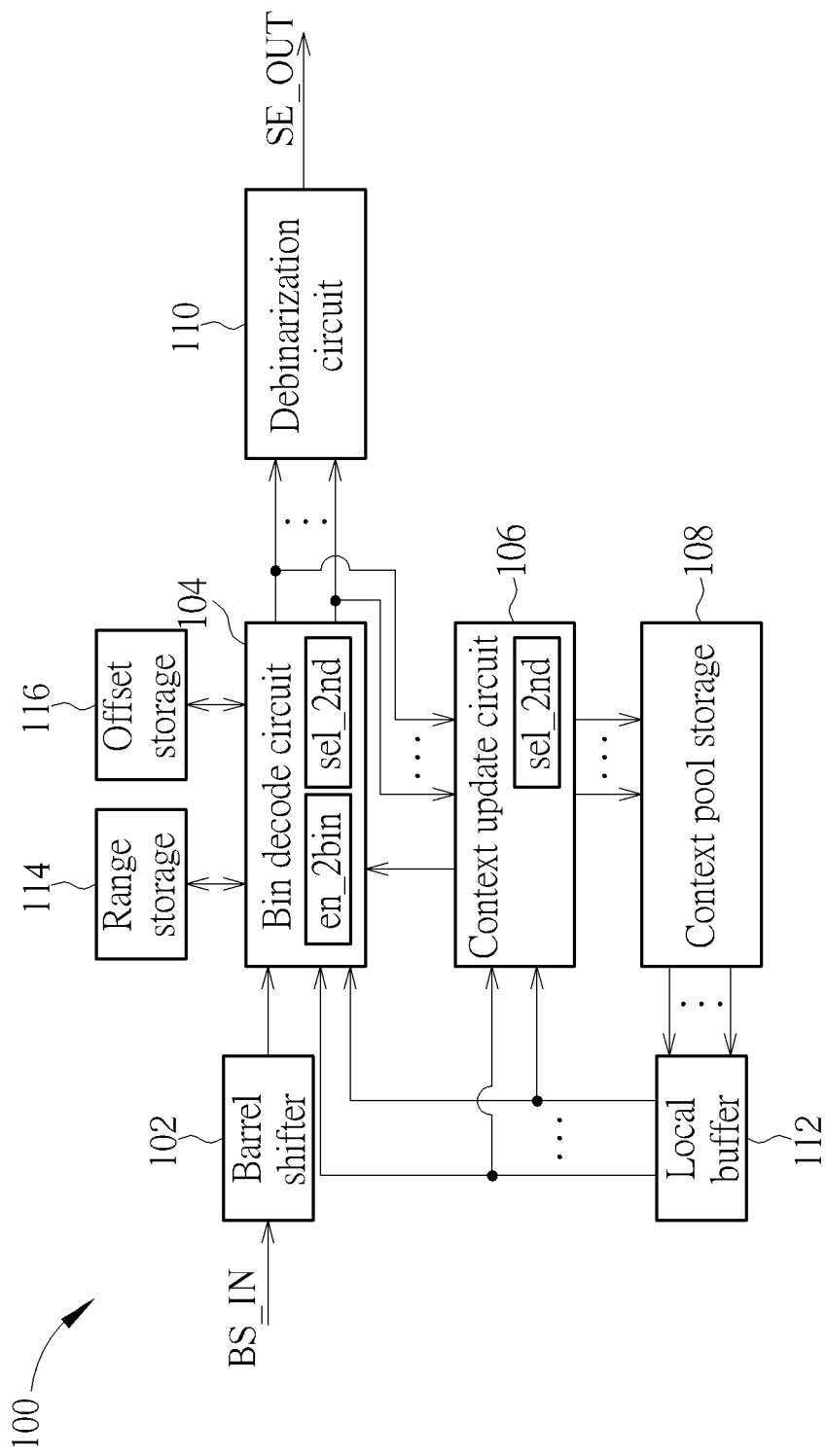
FIG. 1 is a diagram illustrating a CABAC decoder according to an embodiment of the present invention.

FIG. 1 is a diagram illustrating a CABAC decoder according to an embodiment of the present invention. The CABAC decoder 100 may be a part of an entropy decoder in a VVC/H.266 decoder. However, this is for illustrative purposes only, and is not meant to be a limitation of the present invention. In practice, any CABAC decoder using the CABAC decoding performance optimization technique proposed by the present invention falls within the scope of the present invention. The CABAC decoder 100 may include a barrel shifter 102, a bin decode circuit 104, a context update circuit 106, a context pool storage 108, a debinarization circuit 110, a local buffer 112, a range storage 114, and an offset storage 116. In this embodiment, the bin decode circuit 104 supports decoding of multiple bins in one cycle (stage) and decoding of only a single bin in one cycle (stage). For example, an internal control signal en_2bin is set based on whether decoding of two bins in one cycle (stage) is enabled. In a case where two bins are decoded in a current cycle (stage), the control signal en_2bin is set by 1 (i.e. en_2bin=1). In another case where only a single bin is decoded in a current cycle (stage), the control signal en_2bin is set by 0 (i.e. en_2bin=0).

The barrel shifter 102 is arranged to receive bits of the bitstream BS_IN, and provide the bin decode circuit 104 with bits to be decoded. The context pool storage 108 is arranged to store contexts of different syntax elements. The contexts needed by decoding of each bin are loaded from the context pool storage 108 and stored in the local buffer 112, and then provided to the bin decode circuit 104 from the local buffer 112. In this embodiment, decoding of each bin requires a set of multiple contexts (P0, P1), where the probability actually used by CABAC decoding is derived from a linear combination of P0 and P1. The range storage 114 is arranged to store and provide a range needed by decoding of one bin. The offset storage 116 is arranged to store and provide an offset needed by decoding of one bin.

Regarding decoding of multiple bins (e.g. first bin and second bin) in one cycle (stage), the bin decode circuit 104 generates a bin value of the first bin according to a first set of multiple contexts obtained from the context pool storage 108 through the local buffer 112, a first range obtained from the range storage 114, and a first offset obtained from the offset storage 116; and generates a bin value of the second bin according to a second set of multiple contexts, a second range and a second offset, where each of the second range and the second offset depends on decoding of the first bin. The debinarization circuit 110 is arranged to apply debinarization to the bin value of the first bin and the bin value of the second bin decoded by the bin decode circuit 104, and generate and output a syntax value output SE_OUT. In addition, the context update circuit 106 is arranged to update the first set of multiple contexts in response to the bin value of the first bin, to generate a first set of multiple updated contexts, and is further arranged to update the second set of multiple contexts in response to the bin value of the second bin, to generate a second set of multiple updated contexts. The context update circuit 106 may write back both of the first set of multiple updated contexts and the second set of multiple updated contexts into the context pool storage 108, or may write back the second set of multiple updated contexts into the context pool storage 108.

Regarding decoding of only a single bin (e.g. first bin) in one cycle (stage), the bin decode circuit 104 generates a bin value of the first bin according to a first set of multiple contexts obtained from the context pool storage 108 through the local buffer 112, a first range obtained from the range storage 114, and a first offset obtained from the offset storage. The debinarization circuit 110 is arranged to apply debinarization to the bin value of the first bin decoded by the bin decode circuit 104, and generate and output the syntax value output SE_OUT. In addition, the context update circuit 106 is arranged to update the first set of multiple contexts in response to the bin value of the first bin, to generate a first set of multiple updated contexts, and write back the first set of multiple updated contexts into the context pool storage 108.

With regard to the multi-bit CABAC decoding in one cycle (stage), the second set of multiple contexts used by decoding of the second bin may be obtained from the context update circuit 106 or obtained from the context pool storage 108 through the local buffer 112. In this embodiment, an internal control signal sel_2nd is set based on whether decoding of the first bin and decoding of the second bin select the same context sources. For example, if decoding of the first bin and decoding of the second bin use the same context index, the control signal sel_2nd is set by 0 (i.e. sel_2nd=0); and if decoding of the first bin and decoding of the second bin use different context indexes, the control signal sel_2nd is set by 1 (i.e. sel_2nd=1). The bin decode circuit 104 and the context update circuit 106 are both controlled by the control signal sel_2nd.

Figure 2:
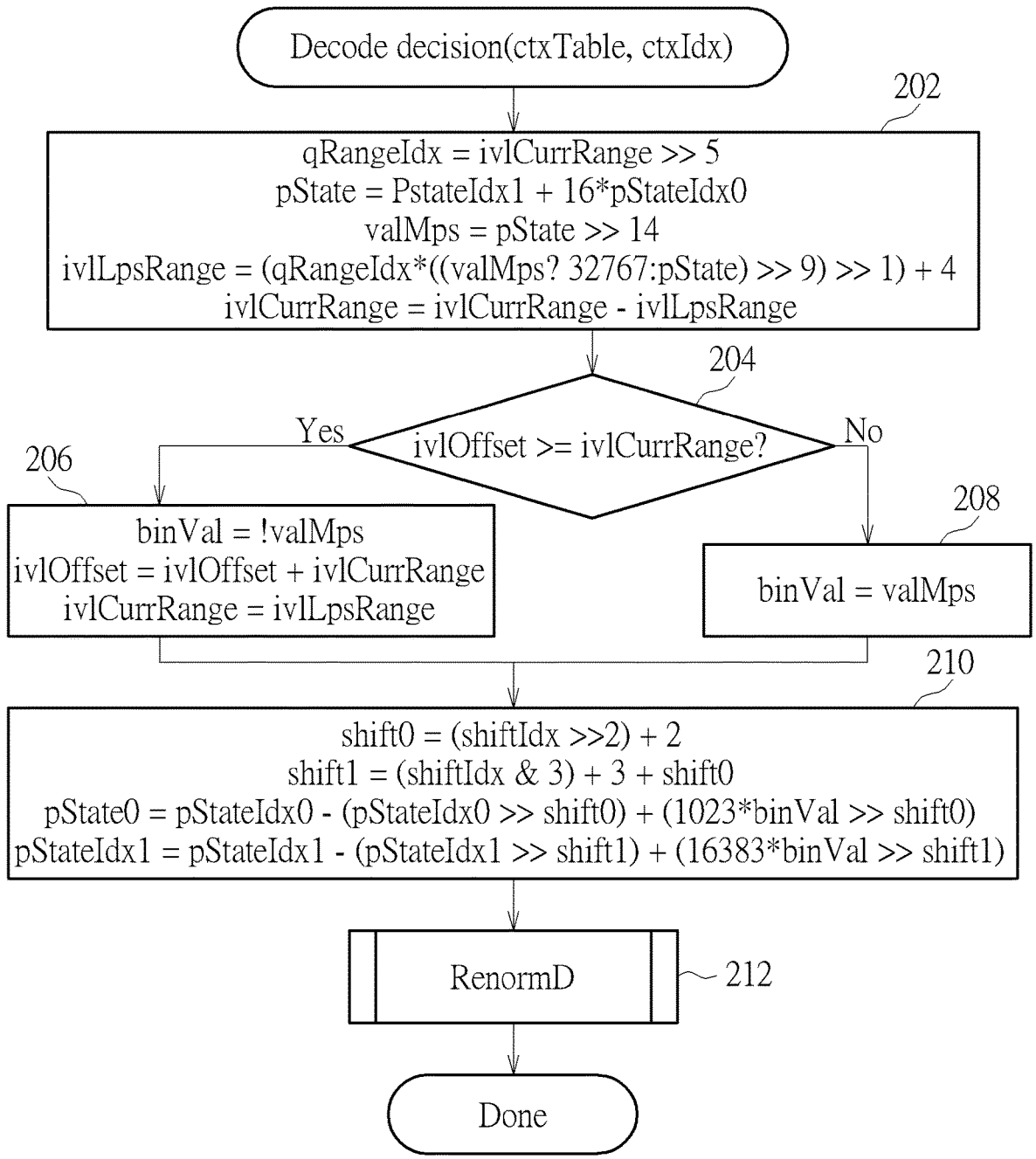
FIG. 2 is a flowchart illustrating a VVC/H.266 CABAC decoding process performed at the CABAC decoder shown in FIG. 1.
Figure 3:
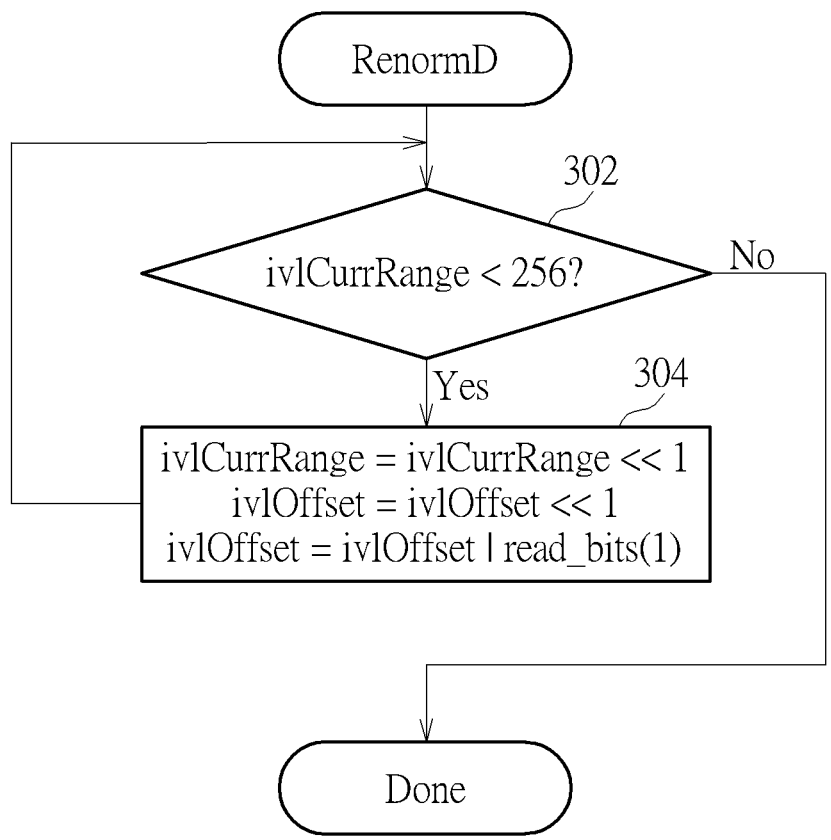
FIG. 3 is a flowchart illustrating a renormalization process performed at the CABAC decoder shown in FIG. 1.

For better comprehension of technical features of the present invention, the following assumes that the CABAC decoder 100 is a VVC/H.266 CABAC decoder. Hence, the CABAC decoder 100 is capable of performing a VVC/H.266 CABAC decoding process as illustrated in FIG. 2. Steps 202, 204, 206, and 208 are directed to a bin decode process. A set of two contexts (pStateIdx0, pStateIdx1) is used to compute the probability that is actually used for decoding a current bin, that is, pState=pStateIdx1+16*pStateIdx0. A comparison result of an offset and a range decides whether a decoded bin value of the current bin is set by an MPS (Most Probability Symbol) value or an LPS (Low Probability Symbol) value. When the decoded bin value of the current bin is set by an LPS value, the range and the offset are further updated. After the bin value of the current bin is decoded, step 210 is performed to deal with a context update process (or called state transition process). The two contexts (pStateIdx0, pStateIdx1) may be updated by using different adaptation rates (shift0, shift1). Step 212 is directed to a renormalization process, as illustrated in FIG. 3. Step 302 checks if the current range is smaller than a threshold value set by 256. When the current range is found smaller than 256, the range and the offset are both updated at step 304. When the current range is found equal to or larger than 256, no renormalization is applied to the range and the offset.

Figure 4:
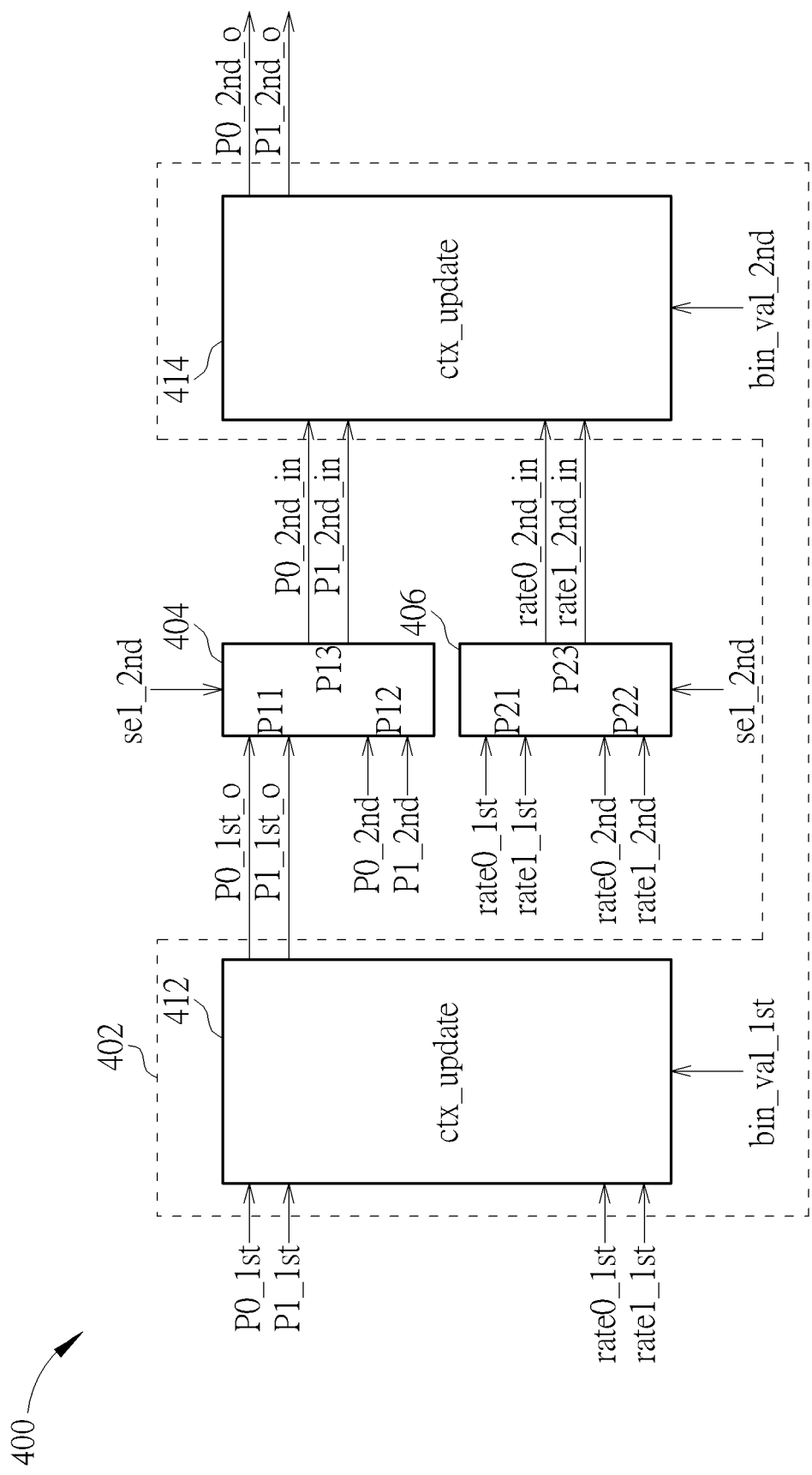
FIG. 4 is a diagram illustrating a first context update circuit design according to an embodiment of the present invention.

FIG. 4 is a diagram illustrating a first context update circuit design according to an embodiment of the present invention. The context update circuit 106 shown in FIG. 1 may be implemented by the context update circuit 400 shown in FIG. 4. The context update circuit 400 employs a 2-bin cascade design for state transition update (context update). As shown in FIG. 4, the context update circuit 400 includes a context update core circuit 402 and a plurality of multiplexers 404 and 406. Regarding decoding of multiple bins (e.g. first bin and second bin) in one cycle (stage), a set of multiple contexts (P0_1st, P1_1st) is used by decoding of the first bin, and a set of multiple contexts (P0_2nd_in, P1_2nd_in) is used by decoding of the second bin. For example, during a VVC/H.266 CABAC decoding process of the first bin, the set of multiple contexts (P0_1st, P1_1st) is involved in computation of pState=pStateIdx1+16*pStateIdx0 at step 202. Similarly, during a VVC/H.266 CABAC decoding process of the second bin, the set of multiple contexts (P0_2nd_in, P1_2nd_in) is involved in computation of pState=pStateIdx1+16*pStateIdx0 at step 202. In response to the bin value bin_val_1st of the first bin decoded by a bin decode circuit (e.g. bin decode circuit 104 shown in FIG. 1), the context update core circuit 402 generates a set of multiple updated contexts (P0_1st_o, P1_1st_o) according to the set of multiple contexts (P0_1st, P1_1st) and a set of multiple adaptation rates (rate0_1st, rate1_1st). For example, during a VVC/H.266 CABAC decoding process of the first bin, the set of multiple contexts (P0_1st, P1_1st) is updated at step 210.

The multiplexer 404 has two input ports P11, P12 and an output port P13. The input port P11 is arranged to receive the set of multiple updated contexts (P0_1st_o, P1_1st_o) generated from the context update core circuit 402. The input port P12 is arranged to receive a set of multiple contexts (P0_2nd, P1_2nd) loaded from the context pool storage 108. The control signal sel_2nd is used as a control signal of the multiplexer 404.

The multiplexer 406 has two input ports P21, P22 and an output port P23. The input port P21 is arranged to receive the set of adaptation rates (rate0_1st, rate1_1st). The input port P22 is arranged to receive a set of multiple adaptation rates (rate0_2nd, rate1_2nd). The control signal sel_2nd is used as a control signal of the multiplexer 406.

Consider a case where the bin decode circuit 104 is controlled to operate under a two-bin-one-cycle CABAC decoding mode (en_2bin=1). When decoding of the first bin and decoding of the second bin select the same context sources (sel_2nd=0), the multiplexer 404 couples the output port P13 to the input port P11, and the multiplexer 406 couples the output port P23 to the input port P21, such that the set of multiple contexts (P0_2nd_in, P1_2nd_in) used by decoding of the second bin is set by the set of multiple updated contexts (P0_1st_o, P1_1st_o), and a set of multiple adaptation rates (rate0_2nd_in, rate1_2nd_in) used by decoding of the second bin is set by the set of multiple adaptation rates (rate0_1st, rate1_1st).

When decoding of the first bin and decoding of the second bin select different context sources (sel_2nd=1), the multiplexer 404 couples the output port P13 to the input port P12, and the multiplexer 406 couples the output port P23 to the input port P22, such that the set of multiple contexts (P0_2nd_in, P1_2nd_in) used by decoding of the second bin is set by the set of multiple contexts (P0_2nd, P1_2nd), and the set of multiple adaptation rates (rate0_2nd_in, rate1_2nd_in) used by decoding of the second bin is set by the set of multiple adaptation rates (rate0_2nd, rate1_2nd).

In response to the bin value bin_val_2nd of the second bin decoded by the bin decode circuit 104, the context update core circuit 402 generates a set of multiple updated contexts (P0_2nd_o, P1_2nd_o) according to the set of multiple contexts (P0_2nd_in, P1_2nd_in) and the set of multiple adaptation rates (rate0_2nd_in, rate1_2nd_in). For example, during a VVC/H.266 CABAC decoding process of the second bin, the set of multiple contexts (P0_2nd_in, P1_2nd_in) is updated at step 210.

The set of multiple contexts (P0_1st, P1_1st) is set by stored contexts loaded from the context pool storage 108. When decoding of the first bin and decoding of the second bin select the same context sources (sel_2nd=0), the context update core circuit 402 writes back the set of multiple updated contexts (P0_2nd_o, P1_2nd_o) into the context pool storage 108 for updating/overwriting the stored contexts in the context pool storage 108 by the set of multiple updated contexts (P0_2nd_o, P1_2nd_o).

Figure 5:
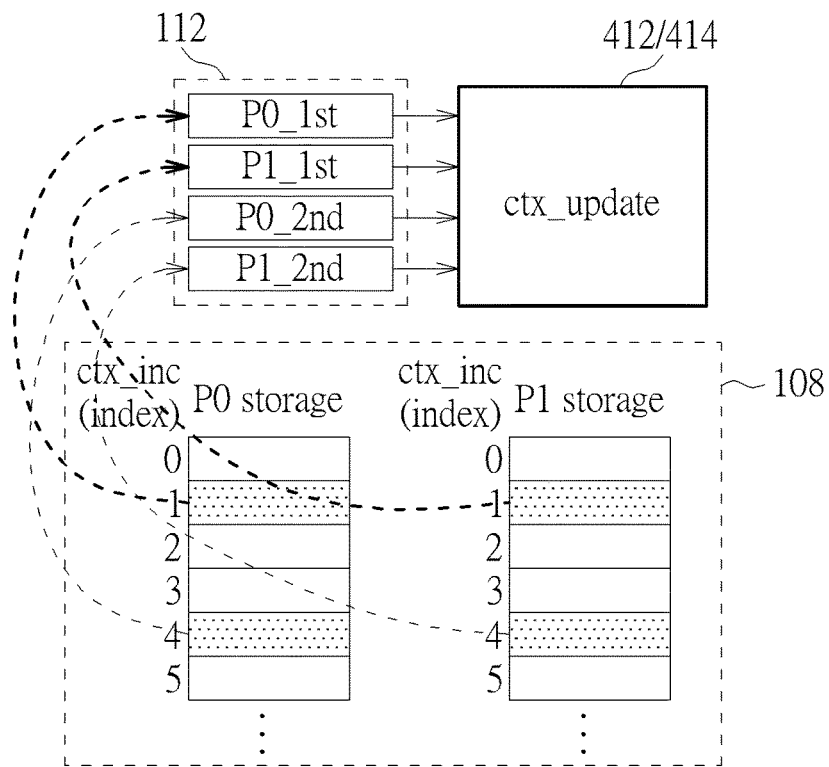
FIG. 5 is a diagram illustrating a context load operation performed under a condition of sel_2nd=1 according to an embodiment of the present invention.

When decoding of the first bin and decoding of the second bin select different context sources (sel_2nd=1), the set of multiple contexts (P0_1st, P1_1st) is set by first stored contexts loaded from the context pool storage 108, and the set of multiple contexts (P0_2nd, P1_2nd) is set by second stored contexts loaded from the context pool storage 108. FIG. 5 is a diagram illustrating a context load operation performed under a condition of sel_2nd=1 according to an embodiment of the present invention. The context pool storage 108 may include a P0 storage and a P1 storage. The context index ctx_inc associated with decoding of the first bin is different from the context index ctx_inc associated with decoding of the second bin. As shown in FIG. 5, the set of multiple contexts (P0_1st, P1_1st) indexed by ctx_inc=1 is loaded from the context pool storage 108 and stored in the local buffer 112, and the set of multiple contexts (P0_2nd, P1_2nd) indexed by ctx_inc=4 is loaded from the context pool storage 108 and stored in the local buffer 112.

Figure 6:
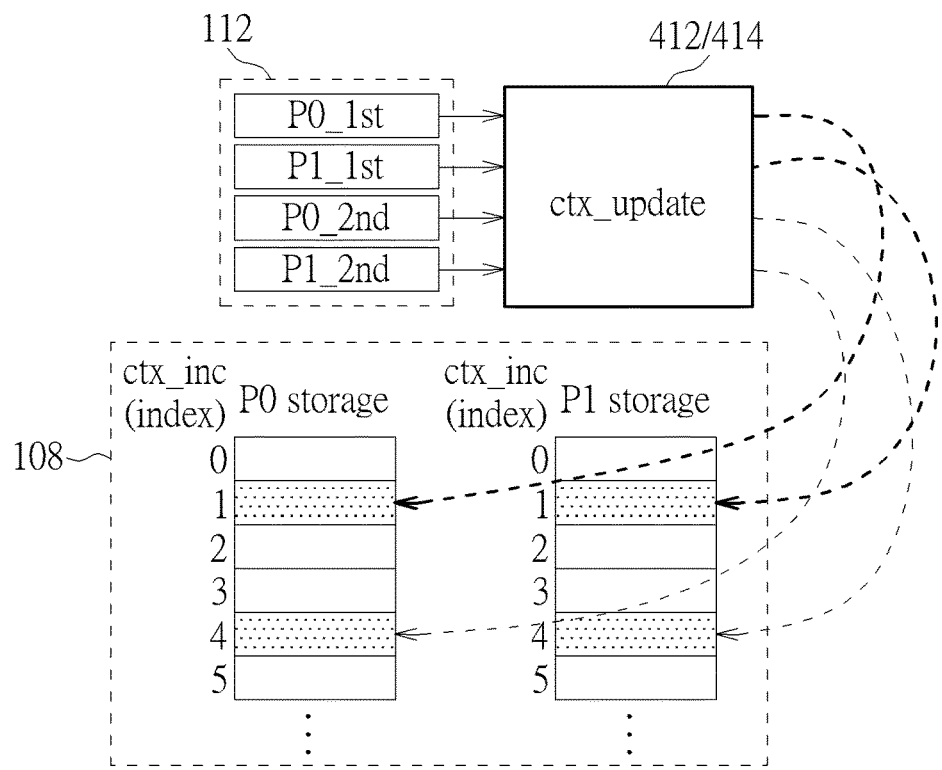
FIG. 6 is a diagram illustrating a context update and write-back operation performed under a condition of sel_2nd=1 according to an embodiment of the present invention.

Since decoding of the first bin and decoding of the second bin select different context sources (sel_2nd=1), the context update core circuit 402 writes back the set of multiple updated contexts (P0_1st_o, P1_1st_o) into the context pool storage 108 for updating/overwriting the first stored contexts in the context pool storage 108 by the set of multiple updated contexts (P0_1st_o, P1_1st_o), and further writes back the set of multiple updated contexts (P0_2nd_o, P1_2nd_o) into the context pool storage 108 for updating/overwriting the second stored contexts in the context pool storage 108 by the set of multiple updated contexts (P0_2nd_o, P1_2nd_o). FIG. 6 is a diagram illustrating a context update and write-back operation performed under a condition of sel_2nd=1 according to an embodiment of the present invention. The set of multiple contexts (P0_1st, P1_1st) indexed by ctx_inc=1 in the context pool storage 108 is updated/overwritten by the set of multiple updated contexts (P0_1st_o, P1_1st_o). In addition, the set of multiple contexts (P0_2nd, P1_2nd) indexed by ctx_inc=4 in the context pool storage 108 is updated/overwritten by the set of multiple updated contexts (P0_2nd_o, P1_2nd_o).

When the bin decode circuit 104 is controlled to operate under a one-bin-one-cycle CABAC decoding mode (en_2bin=0), the set of multiple contexts (P0_1st, P1_1st) used for decoding only a single bin in one cycle (stage) is set by stored contexts loaded from the context pool storage 108. Hence, the context update core circuit 402 writes back the set of multiple updated contexts (P0_1st_o, P1_1st_o) into the context pool storage 108 for updating/overwriting the stored contexts in the context pool storage 108 by the set of multiple updated contexts (P0_1st_o, P1_1st_o).

The context update core circuit 402 is shown having two processing circuits (labeled by "ctx_update") 412 and 414. In one exemplary design, the processing circuits 412 and 414 may be individual processing circuits, where the processing circuit 412 is dedicated to dealing with context update of the set of multiple contexts (P0_1st, P1_1st) used by decoding of the first bin, and the processing circuit 414 is dedicated to dealing with context update of the set of multiple contexts (P0_2nd_in, P1_2nd_in) used by decoding of the second bin. In another exemplary design, the processing circuits 412 and 414 may be the same processing circuit (i.e. shared processing circuit) that is used to deal with context update of the set of multiple contexts (P0_1st, P1_1st) used by decoding of the first bin, and is reused to deal with context update of the set of multiple contexts (P0_2nd_in, P1_2nd_in) used by decoding of the second bin. To put it simply, the present invention has no limitations on the physical implementation of the context update core circuit 402.

Figure 7:
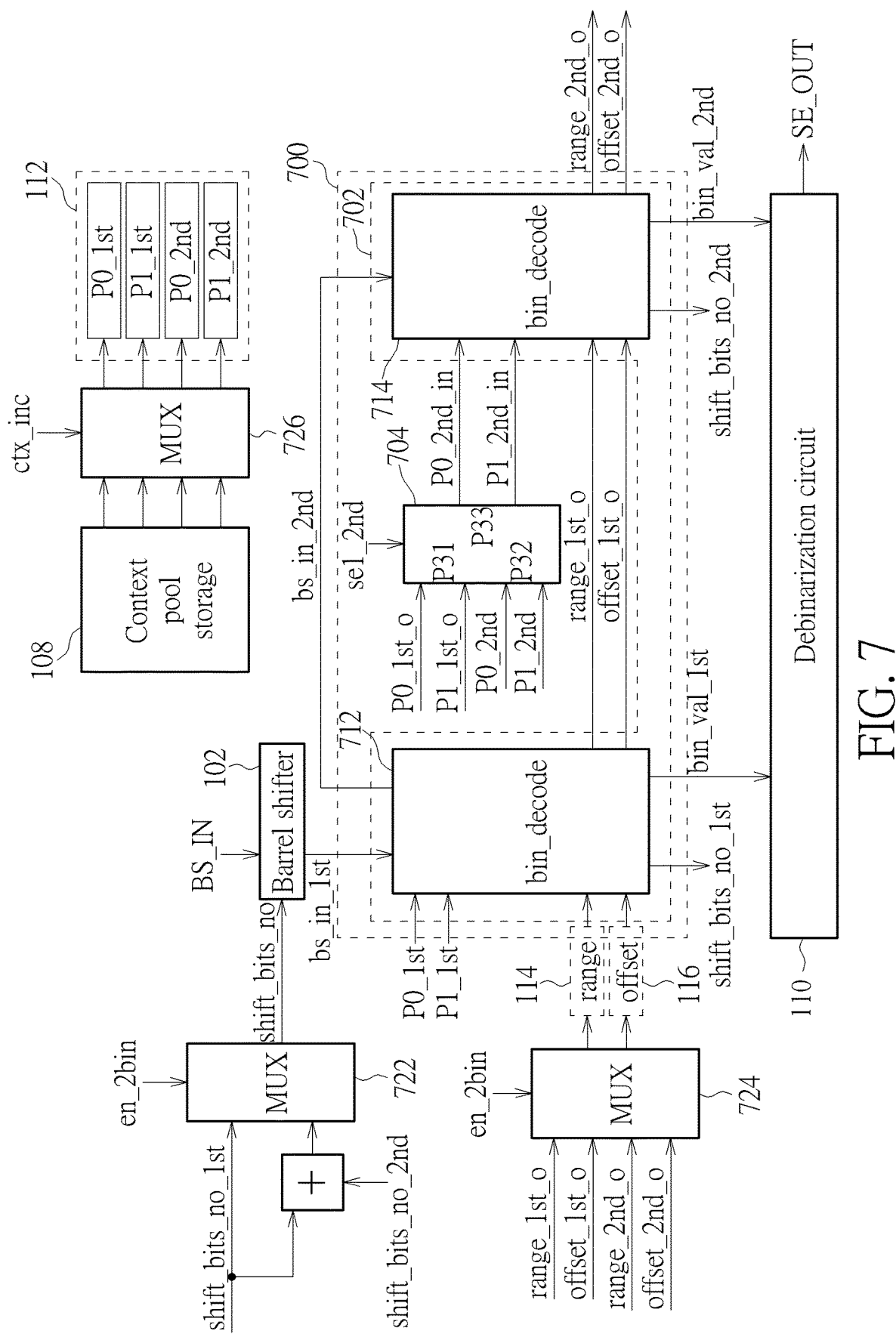
FIG. 7 is a diagram illustrating a first bin decode circuit design according to an embodiment of the present invention.

FIG. 7 is a diagram illustrating a first bin decode circuit design according to an embodiment of the present invention. The bin decode circuit 104 shown in FIG. 1 may be implemented by the bin decode circuit 700 shown in FIG. 7. The bin decode circuit 700 employs a 2-bin cascade design for decoding of multiple bins in one cycle (stage). As shown in FIG. 7, the bin decode circuit 700 includes a bin decode core circuit 702 and a multiplexer 704. Regarding decoding of multiple bins (e.g. first bin and second bin) in one cycle (stage), the bin decode core circuit 702 receives a first partial bitstream input bs_in_1st and a second partial bitstream input bs_in_2nd that are output from the barrel shifter 102. The bin decode core circuit 702 decodes and generates the bin value bin_val_1st of the first bin according to the set of multiple contexts (P0_1st, P1_1st), a range, and an offset. For example, during a VVC/H.266 CABAC decoding process of the first bin, the bin value bin_val_1st of the first bin is generated at step 206 or step 208. In addition, the bin decode core circuit 702 provides a range range_1st_o and an offset offset_1st_o that will be used for decoding the second bin in the same cycle (stage) The range output and the offset output after the decoding of the first bin may be the same as or different from the range input and the offset input before the decoding of the first bin. For example, the range range_1st_o and the offset offset_1st_o may be obtained by updating the range range_1st and the offset offset_1$^{st}$ at step 206 and/or step 212.

The bin decode core circuit 702 decodes and generates the bin value bin_val_2nd of the second bin according to the set of multiple contexts (P0_2nd_in, P1_2nd_in), the range range_1st_o, and the offset offset_1st_o. For example, during a VVC/H.266 CABAC decoding process of the second bin, the bin value bin_val_2nd of the second bin is generated at step 206 or step 208. In addition, the bin decode core circuit 702 provides a range range_2nd_o and an offset offset_2nd_o. The range output and the offset output after the decoding of the second bin may be the same as or different from the range input and the offset input before the decoding of the second bin. For example, the range range_2nd_o and the offset offset_2nd_o may be obtained by updating the range range_1st_o and the offset offset_1st_o at step 206 and/or step 212.

The multiplexer 704 has two input ports P31, P32 and an output port P33. An operation of the multiplexer 704 is similar to that of the multiplexer 404 shown in FIG. 4. The input port P31 is arranged to receive the set of multiple updated contexts (P0_1st_o, P1_1st_o) generated from a context update circuit (e.g., context update circuit 400 shown in FIG. 4). The input port P32 is arranged to receive the set of multiple contexts (P0_2nd, P1_2nd) loaded from the context pool storage 108. The control signal sel_2nd is used as a control signal of the multiplexer 704.

Consider a case where the bin decode circuit 700 is controlled to operate under a two-bin-one-cycle CABAC decoding mode (en_2bin=1). When decoding of the first bin and decoding of the second bin select the same context sources (sel_2nd=0), the multiplexer 704 couples the output port P33 to the input port P31, such that the set of multiple contexts (P0_2nd_in, P1_2nd_in) used by decoding of the second bin is set by the set of multiple updated contexts (P0_1st_o, P1_1st_o). When decoding of the first bin and decoding of the second bin select different context sources (sel_2nd=1), the multiplexer 704 couples the output port P33 to the input port P32, such that the set of multiple contexts (P0_2nd_in, P1_2nd_in) used by decoding of the second bin is set by the set of multiple contexts (P0_2nd, P1_2nd).

The bin decode circuit 700 may also support decoding of only a single bin in one cycle (stage). When the bin decode circuit 700 is controlled to operate under a one-bin-one-cycle CABAC decoding mode (en_2bin=0), the bin decode core circuit 702 receives a first partial bitstream input bs_in_1st that is output from the barrel shifter 102, and decodes and generates the bin value bin_val_1st of the first bin according to the set of multiple contexts (P0_1st, P1_1st), a range, and an offset, where the range range_1st_o and the offset offset_1st_o are generated after decoding of the first bin.

The bin decode core circuit 702 is shown having two processing circuits (labeled by "bin_decode") 712 and 714. In one exemplary design, the processing circuits 712 and 714 may be individual processing circuits, where the processing circuit 712 is dedicated to dealing with decoding of the first bin for generating the bin value bin_val_1st, and the processing circuit 714 is dedicated to dealing with decoding of the second bin for generating the bin value bin_val_2nd. In another exemplary design, the processing circuits 712 and 714 may be the same processing circuit (i.e. shared processing circuit) that is used to deal with decoding of the first bin for generating the bin value bin_val_1$^{st}$, and is reused to deal with decoding of the second bin for generating the bin value bin_val_2nd. To put it simply, the present invention has no limitations on the physical implementation of the bin decode core circuit 702.

After decoding of the first bin, the bin decode core circuit 702 outputs one indication value shift_bits_no_1st that indicates how many bits are consumed during first bin's CABAC decoding, and outputs another indication value shift_bits_no_2nd that indicates how many bits are consumed during second bin's CABAC decoding. The CABAC decoder 100 may further include a multiplexer (MUX) 722 controlled by the control signal en_2bin. When the bin decode circuit 700 is controlled to operate under a two-bin-one-cycle CABAC decoding mode (en_2bin=1), the indication values shift_bits_no_1st and shift_bits_no_2nd are summed up to set an indication value shift_bits_no that indicates how many bits are consumed during the current cycle (stage). When the bin decode circuit 700 is controlled to operate under a one-bin-one-cycle CABAC decoding mode (en_2bin=0), the indication values shift_bits_no_1st is output as the indication value shift_bits_no. Regarding CABAC decoding in each cycle (stage), the barrel shifter 102 operates in response to the indication value shift_bits_no.

The CABAC decoder 100 may further include a multiplexer (MUX) 724 controlled by the control signal en_2bin. When the bin decode circuit 700 is controlled to operate under a two-bin-one-cycle CABAC decoding mode (en_2bin=1), the range output and the offset output obtained after decoding of the second bin (i.e. range_2nd_o and offset_2nd_o) are selected and output by the multiplexer 724 for updating the current range recorded in the range storage 114 and the current offset recorded in the offset storage 116, respectively. When the bin decode circuit 700 is controlled to operate under a one-bin-one-cycle CABAC decoding mode (en_2bin=0), the range output and the offset output obtained after decoding of the first bin (i.e. range_1st_o and offset_1st_o) are selected and output by the multiplexer 724 for updating the current range recorded in the range storage 114 and the current offset recorded in the offset storage 116, respectively.

The CABAC decoder 100 may further include a multiplexer (MUX) 726 controlled by the context index ctx_inc. In this embodiment, the local buffer 112 may be configured to have at least four local buffer units. When the bin decode circuit 700 is controlled to operate under a two-bin-one-cycle CABAC decoding mode (en_2bin=1) and the decoding of the first bin and decoding of the second bin select the same context sources (sel_2nd=0), the multiplexer 726 controlled by the context index ctx_inc may only load the set of multiple contexts (P0_1st, P1_1st) from the context pool storage 108 into two local buffer units of the local buffer 112. When the bin decode circuit 700 is controlled to operate under a two-bin-one-cycle CABAC decoding mode (en_2bin=1) and the decoding of the first bin and decoding of the second bin select different context sources (sel_2nd=1), the multiplexer 726 controlled by the context index ctx_inc may load both of the set of multiple contexts (P0_1st, P1_1st) and the set of multiple contexts (P0_2nd, P1_2nd) from the context pool storage 108 into four local buffer units of the local buffer 112. When the bin decode circuit 700 is controlled to operate under a one-bin-one-cycle CABAC decoding mode (en_2bin=0), the multiplexer 726 controlled by the context index ctx_inc may only load the set of multiple contexts (P0_1st, P1_1st) from the context pool storage 108 into two local buffer units of the local buffer 112.

Figure 8:
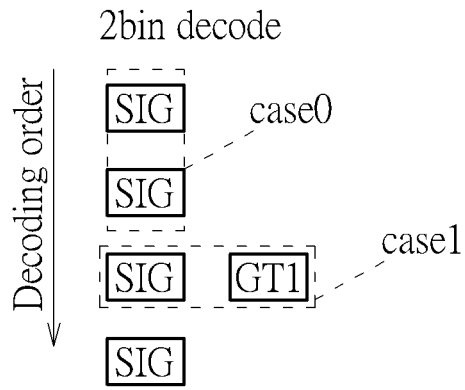
FIG. 8 is a diagram illustrating an example of VVC/H.266 coefficient decoding performed at the CABAC decoder shown in FIG. 1.
Figure 9:
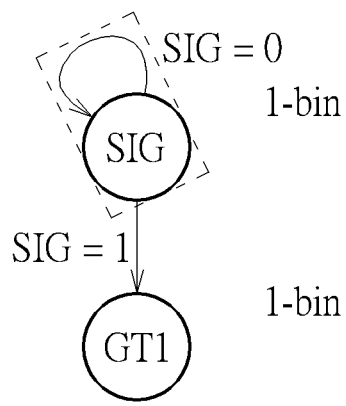
FIG. 9 is a diagram illustrating different cases encountered during two-bin VVC/H.266 CABAC decoding performed at the CABAC decoder shown in FIG. 1.
Figure 9:
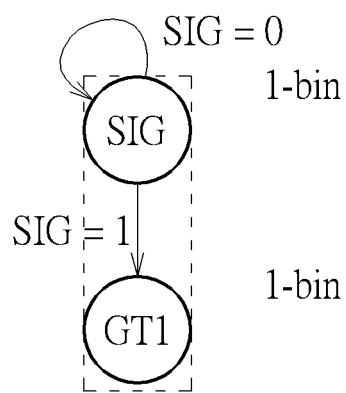

In certain multi-bin CABAC decoding scenarios, the second bin's context selection may depend on the bin value of the first bin, which may require preloading of two sets of multiple contexts (P0_2nd_c0, P1_2nd_c0) and (P0_2nd_c1, P1_2nd_c1) before decoding of the second bin. Please refer to FIG. 8 in conjunction with FIG. 9. FIG. 8 is a diagram illustrating a VVC/H.266 coefficient decoding example. FIG. 9 is a diagram illustrating different cases encountered during two-bin VVC/H.266 CABAC decoding. The decoding order may be a reverse diagonal scan order as specified in the VVC/H.266 standard. The syntax element sig_coeff_flag (labeled by "SIG") at a coefficient position (scan position) indicates whether an absolute value of a coefficient level is larger than 0. The syntax element abs_level_gt1_flag (labeled by "GT1") at a coefficient position (scan position) indicates whether an absolute value of a coefficient level is larger than 1. It should be noted that the syntax element abs_level_gt1_flag is only decoded when the syntax element sig_coeff_flag indicates that the absolute value of the coefficient level is not equal to 0. Hence, regarding decoding of two bins in one cycle (stage), the first bin may be decoded for obtaining a syntax value of the syntax element sig_coeff_flag at a current coefficient position (current scan position), and the second bin may be decoded for obtaining a syntax value of the syntax element sig_coeff_flag at a next coefficient position (next scan position), which is case0 as illustrated in sub-diagram (A) of FIG. 9. Specifically, an SIG-SIG 2-bin decode operation is performed in one cycle (stage) when the bin value of the first bin is equal to 0 (i.e. SIG==0). Alternatively, regarding decoding of two bins in one cycle (stage), the first bin may be decoded for obtaining a syntax value of the syntax element sig_coeff_flag at a current coefficient position (current scan position), and the second bin may be decoded for obtaining a syntax value of the syntax element abs_level_gt1_flag at the same coefficient position (scan position), which is case 1 as illustrated in sub-diagram (B) of FIG. 9. Specifically, an SIG-GT1 2-bin decode operation is performed in one cycle (stage) when the bin value of the first bin is equal to 1 (i.e. SIG==1). To deal with above cases in which the second bin's context selection depends on the bin value of the first bin, an embodiment of the present invention may employ a CABAC decoder design that offers two paths associated with decoding of the second bin. Further description is provided as below with reference to the accompanying drawings.

Figure 10:
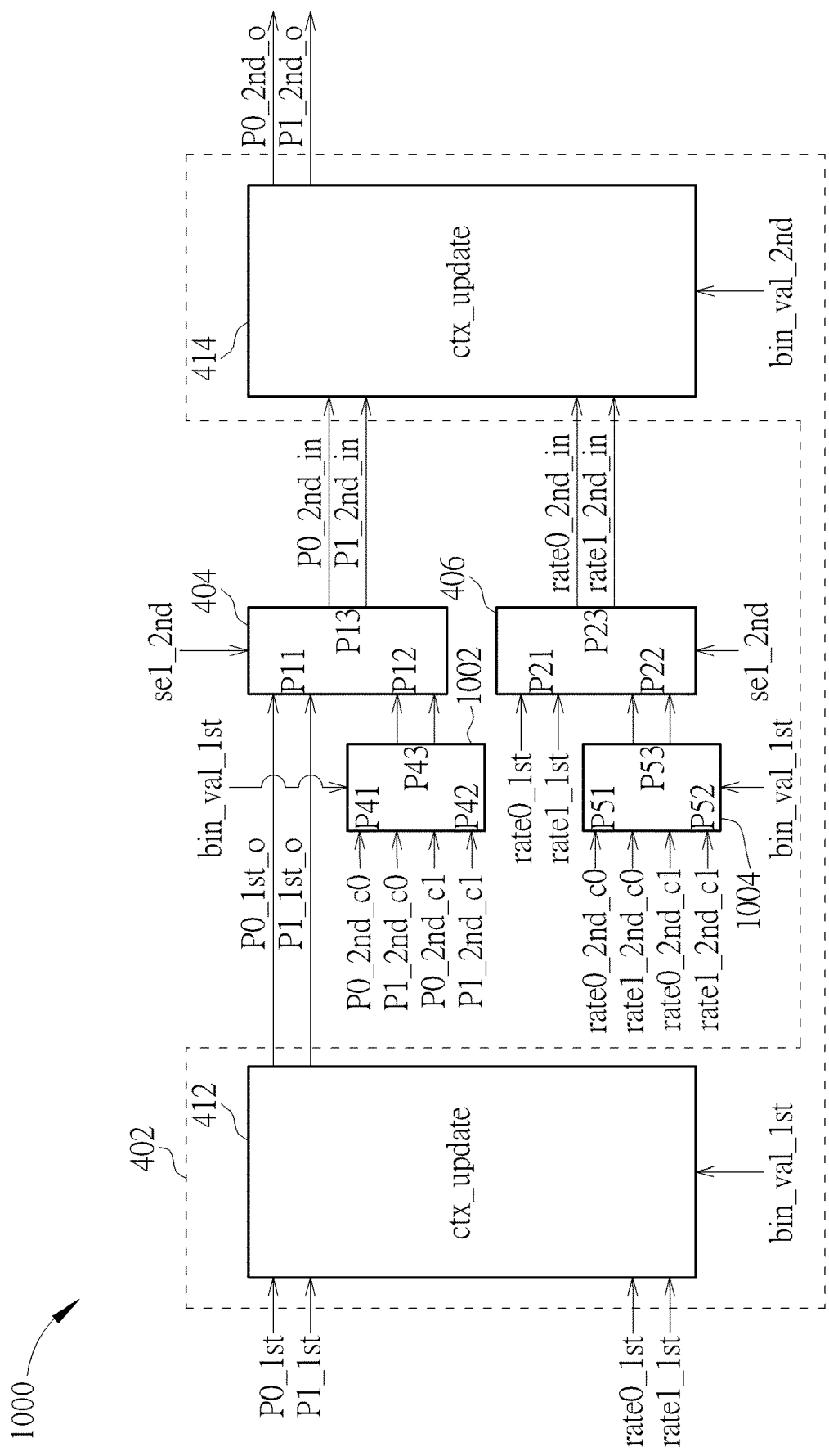
FIG. 10 is a diagram illustrating a second context update circuit design according to an embodiment of the present invention.

FIG. 10 is a diagram illustrating a second context update circuit design according to an embodiment of the present invention. The context update circuit 106 shown in FIG. 1 may be implemented by the context update circuit 1000 shown in FIG. 10. The major difference between the context update circuits 400 and 1000 is that the context update circuit 1000 further includes two multiplexers 1002 and 1004.

The multiplexer 1002 has two input ports P41, P42 and an output port P43. The input port P41 is arranged to receive the set of multiple contexts (P0_2nd_c0, P1_2nd_c0) loaded from the context pool storage 108. The input port P42 is arranged to receive the set of multiple contexts (P0_2nd_c1, P1_2nd_c1) loaded from the context pool storage 108. The control signal of the multiplexer 1002 is set based on the bin value bin_val_1st of the first bin.

The multiplexer 1004 has two input ports P51, P52 and an output port P53. The input port P51 is arranged to receive a set of adaptation rates (rate0_2nd_c0, rate1_2nd_c0). The input port P52 is arranged to receive a set of multiple adaptation rates (rate0_2nd_c1, rate1_2nd_c1). The control signal of the multiplexer 1004 is set based on the bin value bin_val_1st of the first bin.

Consider a case where the bin decode circuit 104 is controlled to operate under a two-bin-one-cycle CABAC decoding mode (en_2bin=1), decoding of the first bin and decoding of the second bin select different context sources (sel_2nd=1), and the bin value bin_val_1st of the first bin is equal to 0 (bin_val_1st=0), the multiplexer 1002 selects and outputs the set of multiple contexts (P0_2nd_c0, P1_2nd_c0) to the input port P12 of the multiplexer 404, the multiplexer 404 selects and outputs the set of multiple contexts (P0_2nd_c0, P1_2nd_c0) to serve as the set of multiple contexts (P0_2nd_in, P1_2nd_in), the multiplexer 1004 selects and outputs the set of multiple adaptation rates (rate0_2nd_c0, rate1_2nd_c0) to the input port P22 of the multiplexer 406, and the multiplexer 406 selects and outputs the set of multiple adaptation rates (rate0_2nd_c0, rate1_2nd_c0) to serve as the set of multiple adaptation rates (rate0_2nd_in, rate1_2nd_in), where the context update core circuit 402 generates the set of multiple updated contexts (P0_2nd_o, P1_2nd_o) according to the set of multiple contexts (P0_2nd_c0, P1_2nd_c0) and the set of multiple adaptation rates (rate0_2nd_c0, rate1_2nd_c0).

Consider another case where the bin decode circuit 104 is controlled to operate under a two-bin-one-cycle CABAC decoding mode (en_2bin=1), decoding of the first bin and decoding of the second bin select different context sources (sel_2nd=1), and the bin value bin_val_1st of the first bin is equal to 1 (bin_val_1st=1), the multiplexer 1002 selects and outputs the set of multiple contexts (P0_2nd_c1, P1_2nd_c1) to the input port P12 of the multiplexer 404, the multiplexer 404 selects and outputs the set of multiple contexts (P0_2nd_c1, P1_2nd_c1) to serve as the set of multiple contexts (P0_2nd_in, P1_2nd_in), the multiplexer 1004 selects and outputs the set of multiple adaptation rates (rate0_2nd_c1, rate1_2nd_c1) to the input port P22 of the multiplexer 406, and the multiplexer 406 selects and outputs the set of multiple adaptation rates (rate0_2nd_c1, rate1_2nd_c1) to serve as the set of multiple adaptation rates (rate0_2nd_in, rate1_2nd_in), where the context update core circuit 402 generates the set of multiple updated contexts (P0_2nd_o, P1_2nd_o) according to the set of multiple contexts (P0_2nd_c1, P1_2nd_c1) and the set of multiple adaptation rates (rate0_2nd_c1, rate1_2nd_c1).

Figure 11:
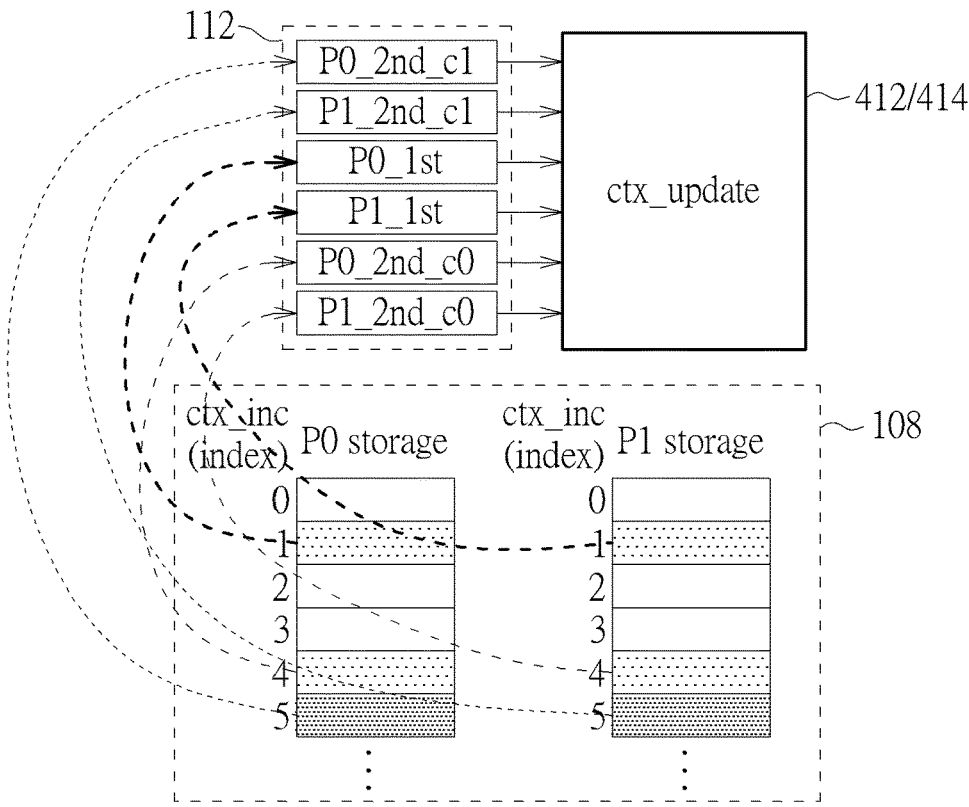
FIG. 11 is a diagram illustrating another context load operation performed under a condition of sel_2nd=1 according to an embodiment of the present invention.

The set of multiple contexts (P0_1st, P1_1st) is set by first stored contexts loaded from the context pool storage 108. The set of multiple contexts (P0_2nd_c0, P1_2nd_c0) is set by second stored contexts loaded from the context pool storage 108. The set of multiple contexts (P0_2nd_c1, P1_2nd_c1) is set by third stored contexts loaded from the context pool storage 108. FIG. 11 is a diagram illustrating another context load operation performed under a condition of sel_2nd=1 according to an embodiment of the present invention. The context pool storage 108 may include a P0 storage and a P1 storage. The context index ctx_inc associated with decoding of the first bin is different from the context index ctx_inc associated with decoding of the second bin. As shown in FIG. 11, the set of multiple contexts (P0_1st, P1_1st) indexed by ctx_inc=1 is loaded from the context pool storage 108 and stored in the local buffer 112, the set of multiple contexts (P0_2nd_c0, P1_2nd_c0) indexed by ctx_inc=4 is loaded from the context pool storage 108 and stored in the local buffer 112, and the set of multiple contexts (P0_2nd_c1, P1_2nd_c1) indexed by ctx_inc=5 is loaded from the context pool storage 108 and stored in the local buffer 112.

Figure 12:
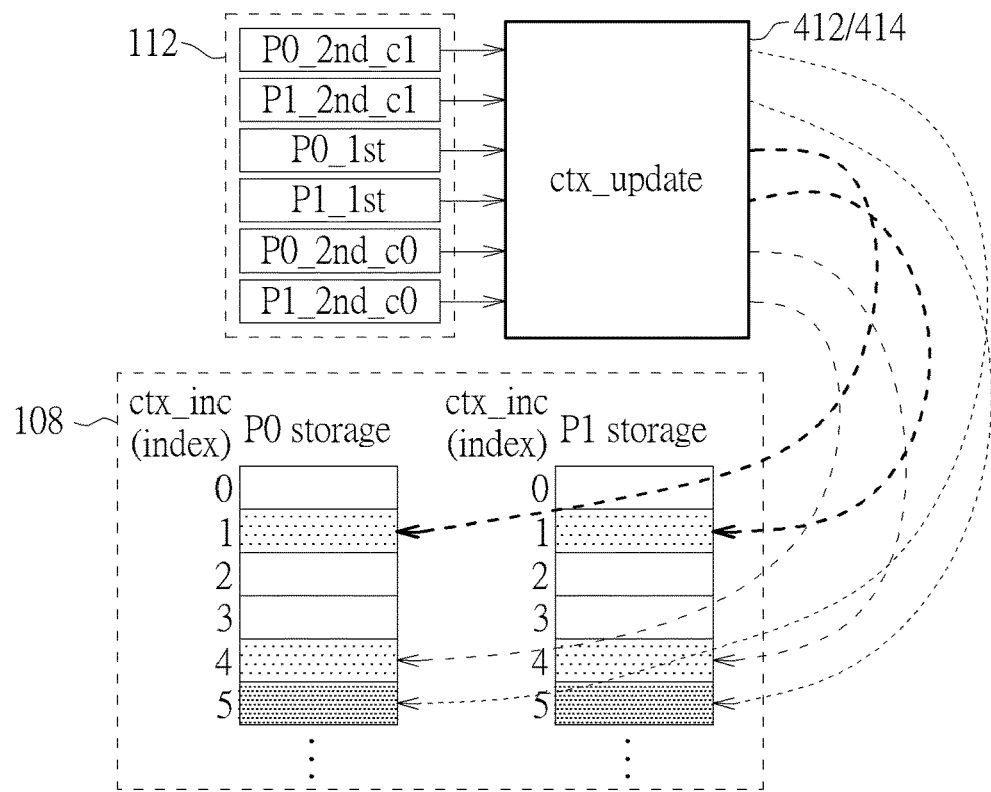
FIG. 12 is a diagram illustrating another context update and write-back operation performed under a condition of sel_2nd=1 according to an embodiment of the present invention.

FIG. 12 is a diagram illustrating another context update and write-back operation performed under a condition of sel_2nd=1 according to an embodiment of the present invention. Since decoding of the first bin and decoding of the second bin select different context sources (sel_2nd=1), the context update core circuit 402 writes back the set of multiple updated contexts (P0_1st_o, P1_1st_o) into the context pool storage 108 for updating/overwriting the first stored contexts in the context pool storage 108 by the set of multiple updated contexts (P0_1st_o, P1_1st_o), writes back the set of multiple updated contexts (P0_2nd_o, P1_2nd_o) into the context pool storage 108 for updating/overwriting the second stored contexts in the context pool storage 108 by the set of multiple updated contexts (P0_2nd_o, P1_2nd_o) if val_bin_1st is equal to 0, and writes back the set of multiple updated contexts (P0_2nd_o, P1_2nd_o) into the context pool storage 108 for updating/overwriting the third stored contexts in the context pool storage 108 by the set of multiple updated contexts (P0_2nd_o, P1_2nd_o) if val_bin_1st is equal to 1. Specifically, the set of multiple contexts (P0_1st, P1_1st) indexed by ctx_inc=1 in the context pool storage 108 is replaced with the set of multiple updated contexts (P0_1st_o, P1_1st_o). In addition, the set of multiple contexts (P0_2nd_c0, P1_2nd_c0) indexed by ctx_inc=4 in the context pool storage 108 is replaced with the set of multiple updated contexts (P0_2nd_o, P1_2nd_o) if val_bin_1st is equal to 0, and the set of multiple contexts (P0_2nd_c1, P1_2nd_c1) indexed by ctx_inc=5 in the context pool storage 108 is replaced with the set of multiple updated contexts (P0_2nd_o, P1_2nd_o) if val_bin_1st is equal to 1.

Figure 13:
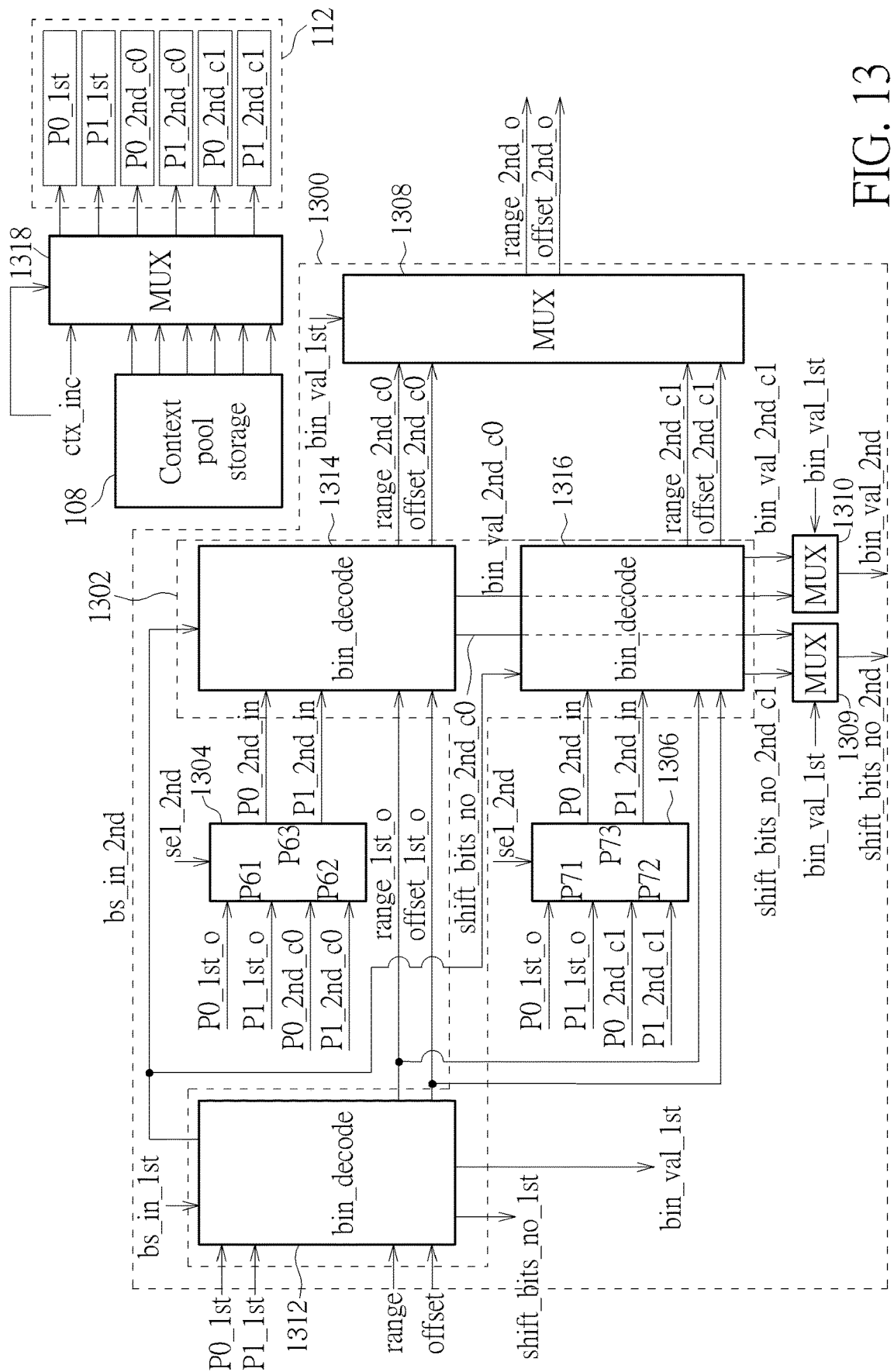
FIG. 13 is a diagram illustrating a second bin decode circuit design according to an embodiment of the present invention.

FIG. 13 is a diagram illustrating a second bin decode circuit design according to an embodiment of the present invention. The bin decode circuit 104 shown in FIG. 1 may be implemented by the bin decode circuit 1300 shown in FIG. 13. For example, the circuit design shown in FIG. 7 may be modified to have the bin decode circuit 700 replaced with the bin decode circuit 1300. Only the circuit components pertinent to the alternative bin decode circuit design are illustrated in FIG. 13 for brevity and simplicity. Like the bin decode circuit 700, the bin decode circuit 1300 is capable of decoding multiple bins in one cycle (stage). As shown in FIG. 13, the bin decode circuit 1300 includes a bin decode core circuit 1302 and a plurality of multiplexers 1304, 1306, 1308, 1309, and 1310. The major difference between the bin decode circuits 700 and 1300 is that the bin decode circuit 1300 includes an additional decode path for the second bin. The bin decode core circuit 1302 receives a first partial bitstream input bs_in_1st and a second partial bitstream input bs_in_2nd that are output from a barrel shifter (e.g. barrel shifter 102 shown in FIG. 7). The bin decode core circuit 1302 decodes and generates the bin value bin_val_1st of the first bin according to the set of multiple contexts (P0_1st, P1_1st), a range, and an offset. For example, during a VVC/H.266 CABAC decoding process of the first bin, the bin value bin_val_1st of the first bin is generated at step 206 or step 208. In addition, the bin decode core circuit 1302 provides a range range_1st_o and an offset offset_1st_o that will be used for decoding the second bin in the same cycle (stage). The range output and the offset output after the decoding of the first bin may be the same as or different from the range input and the offset input before the decoding of the first bin. For example, the range range_1st_o and the offset offset_1st_o may be obtained by updating the range range_1st and the offset offset_1st at step 206 and/or step 212.

The bin decode core circuit 1302 decodes and generates one bin value bin_val_2nd_c0 of the second bin according to the set of multiple contexts (P0_2nd_in, P1_2nd_in), the range range_1st_o, and the offset offset_1st_o. For example, during a VVC/H.266 CABAC decoding process of the second bin, the bin value bin_val_2nd_c0 of the second bin is generated at step 206 or step 208. In addition, the bin decode core circuit 1302 provides a range range_2nd_c0 and an offset offset_2nd_c0. For example, the range range_2nd_c0 and the offset offset_2nd_c0 may be the same as the range range_1st_o and the offset offset_1st_o, respectively, or may be obtained by updating the range range_1st_o and the offset offset_1st_o at step 206 and/or step 212.

The bin decode core circuit 1302 further decodes and generates another bin value bin_val_2nd_c1 of the second bin according to the set of multiple contexts (P0_2nd_in', P1_2nd_in'), the range range_1st_o, and the offset offset_1st_o. For example, during a VVC/H.266 CABAC decoding process of the second bin, the bin value bin_val_2nd_c1 of the second bin is generated at step 206 or step 208. In addition, the bin decode core circuit 1302 provides a range range_2nd_c1 and an offset offset_2nd_c1. For example, the range range_2nd_c1 and the offset offset_2nd_c1 may be the same as the range range_1st_o and the offset offset_1st_o, respectively, or may be obtained by updating the range range_1st_o and the offset offset_1st_o at step 206 and/or step 212.

The multiplexer 1304 has two input ports P61, P62 and an output port P63. The input port P61 is arranged to receive the set of multiple updated contexts (P0_1st_o, P1_1st_o) generated from a context update circuit (e.g. context update circuit 400 shown in FIG. 4). The input port P62 is arranged to receive the set of multiple contexts (P0_2nd_c0, P1_2nd_c0) loaded from the context pool storage 108. The control signal sel_2nd is used as a control signal of the multiplexer 1304.

The multiplexer 1306 has two input ports P71, P72 and an output port P73. The input port P71 is arranged to receive the set of multiple updated contexts (P0_1st_o, P1_1st_o) generated from a context update circuit (e.g. context update circuit 400 shown in FIG. 4). The input port P72 is arranged to receive the set of multiple contexts (P0_2nd_c1, P1_2nd_c1) loaded from the context pool storage 108. The control signal sel_2nd is used as a control signal of the multiplexer 1306.

Consider a case where the bin decode circuit 1300 is controlled to operate under a two-bin-one-cycle CABAC decoding mode (en_2bin=1) and decoding of the first bin and decoding of the second bin select different context sources (sel_2nd=1). The multiplexer 1304 couples the output port P63 to the input port P62, such that the set of multiple contexts (P0_2nd_in, P1_2nd_in) is set by the set of multiple contexts (P0_2nd_c0, P1_2nd_c0). The multiplexer 1306 couples the output port P73 to the input port P72, such that the set of multiple contexts (P0_2nd_in', P1_2nd_in') is set by the set of multiple contexts (P0_2nd_c1, P1_2nd_c1). A control signal of the multiplexer 1310 is set based on the bin value bin_val_1st of the first bin. When the bin value bin_val_1st of the first bin is equal to 0, the multiplexer 1310 selects and outputs the bin value bin_val_2nd_c0 as the bin value bin_val_2nd of the second bin that will undergo debinarization at a debinarization circuit (e.g. debinarization circuit 110 shown in FIG. 7). When the bin value bin_val_1st of the first bin is equal to 1, the multiplexer 1310 selects and outputs the bin value bin_val_2nd_c1 as the bin value bin_val_2nd of the second bin that will undergo debinarization at a debinarization circuit (e.g. debinarization circuit 110 shown in FIG. 7).

In addition, the bin decode core circuit 1302 provides a range range_2nd_c0 and an offset offset_2nd_c0, where the range range_2nd_c0 and the offset offset_2nd_c0 may be the same as the range range_1st_o and the offset offset_1st_o, respectively, or may be obtained by updating the range range_1st_o and the offset offset_1st_o at step 206 and/or step 212. Similarly, the bin decode core circuit 1302 provides a range range_2nd_c1 and an offset offset_2nd_c1, where the range range_2nd_c1 and the offset offset_2nd_c1 may be the same as the range range_1st_o and the offset offset_1st_o, respectively, or may be obtained by updating the range range_1st_o and the offset offset_1st_o at step 206 and/or step 212. A control signal of the multiplexer 1308 is set based on the bin value bin_val_1st of the first bin. When the bin value bin_val_1st of the first bin is equal to 0, the multiplexer 1308 selects and outputs the range range_2nd_c0 and the offset offset_2nd_c0 as the range range_2nd_o and the offset offset_2nd_o, respectively. When the bin value bin_val_1st of the first bin is equal to 1, the multiplexer 1308 selects and outputs the range range_2nd_c1 and the offset offset_2nd_c1 as the range range_2nd_o and the offset offset_2nd_o, respectively. In this case, the range range_2nd_o will be stored into a range storage (e.g. range storage 114 shown in FIG. 7), and the offset offset_2nd_o will be stored into an offset storage (e.g. offset storage 116 shown in FIG. 7).

Consider another case where the bin decode circuit 1300 is controlled to operate under a two-bin-one-cycle CABAC decoding mode (en_2bin=1) and decoding of the first bin and decoding of the second bin select the same context sources (sel_2nd=0). The set of multiple contexts (P0_2nd_in, P1_2nd_in) and the set of multiple contexts (P0_2nd_in', P1_2nd_in') are both set by the same set of multiple updated contexts (P0_1st_o, P1_1st_o). Hence, the bin value bin_val_2nd_c0 is the same as the bin value bin_val_2nd_c1, and the multiplexer 1310 selects and outputs one of the bin values bin_val_2nd_c0 and bin_val_2nd_c1 as the bin value bin_val_2nd of the second bin that will undergo debinarization at a debinarization circuit (e.g. debinarization circuit 110 shown in FIG. 7). In addition, the range range_2nd_c0 is the same as the range range_2nd_c1, and the offset offset_2nd_c0 is the same as the offset offset_2nd_c1. The multiplexer 1308 selects and outputs one of the ranges range_2nd_c0 and range_2nd_c1 as the range range_2nd_o, and selects and outputs one of the offsets offset_2nd_c0 and range_2nd_c1 as the offset offset_2nd_o. In this case, the range range_2nd_o will be stored into a range storage (e.g. range storage 114 shown in FIG. 7), and the offset offset_2nd_o will be stored into an offset storage (e.g. offset storage 116 shown in FIG. 7).

The bin decode circuit 1300 may also support decoding of only a single bin in one cycle (stage). When the bin decode circuit 1300 is controlled to operate under a one-bin-one-cycle CABAC decoding mode (en_2bin=0), the bin decode core circuit 1302 receives a first partial bitstream input bs_in_1st that is output from the barrel shifter 102, and decodes and generates the bin value bin_val_1st_c0 of the first bin according to the set of multiple contexts (P0_1st, P1_1st), a range, and an offset, where the range range_1st_o and the offset offset_1st_o are generated after decoding of the first bin. In this case, the range range_1st_o will be stored into a range storage (e.g. range storage 114 shown in FIG. 7), and the offset offset_1st_o will be stored into an offset storage (e.g. offset storage 116 shown in FIG. 7).

The bin decode core circuit 1302 is shown having three processing circuits (labeled by "bin_decode") 1312, 1314, and 1316. In one exemplary design, the processing circuits 1312, 1314, and 1316 may be individual processing circuits, where the processing circuit 1312 is dedicated to dealing with decoding of the first bin for generating the bin value bin_val_1st, the processing circuit 1314 is dedicated to dealing with decoding of the second bin for generating one bin value bin_val_2nd_c0, and the processing circuit 1316 is dedicated to dealing with decoding of the second bin for generating one bin value bin_val_2nd_c1. In another exemplary design, the processing circuits 1312, 1314, and 1316 may be the same processing circuit (i.e. shared processing circuit) that is used to deal with decoding of the first bin for generating the bin value bin_val_1st, and is reused to deal with decoding of the second bin for generating the bin values bin_val_2nd_c0 and bin_val_2nd_c1. To put it simply, the present invention has no limitations on the physical implementation of the bin decode core circuit 1302.

The bin decode core circuit 1302 further outputs one indication value shift_bits_no_1st that indicates how many bits are consumed during first bin's CABAC decoding, outputs another indication value shift_bits_no_2nd_c0 that indicates how many bits are consumed during second bin's CABAC decoding at one decoding path, and outputs yet another indication value shift_bits_no_2nd_c1 that indicates how many bits are consumed during second bin's CABAC decoding at another decoding path. A control signal of a multiplexer 1309 is set based on the bin value bin_val_1st of the first bin. When the bin value bin_val_1st of the first bin is equal to 0, the multiplexer 1309 selects and outputs the indication value shift_bits_no_2nd_c0 as the indication value shift_bits_no_2nd. When the bin value bin_val_1st of the first bin is equal to 1, the multiplexer 1309 selects and outputs the indication value shift_bits_no_2nd_c1 as the indication value shift_bits_no_2nd.

When the bin decode circuit 1300 is controlled to operate under a two-bin-one-cycle CABAC decoding mode (en_2bin=1), the indication values shift_bits_no_1st and shift_bits_no_2nd are summed up to set the indication value shift_bits_no referenced by a barrel shifter (e.g. barrel shifter 102 shown in FIG. 7). When the bin decode circuit 1300 is controlled to operate under a one-bin-one-cycle CABAC decoding mode (en_2bin=0), the indication values shift_bits_no_1st is output as the indication value shift_bits_no referenced by a barrel shifter (e.g. barrel shifter 102 shown in FIG. 7).

Furthermore, the local buffer 112 may be configured to include at least six local buffer units. When the bin decode circuit 1300 is controlled to operate under a two-bin-one-cycle CABAC decoding mode (en_2bin=1) and the decoding of the first bin and decoding of the second bin select the same context sources (sel_2nd=0), the multiplexer 1318 controlled by the context index ctx_inc may only load the set of multiple contexts (P0_1st, P1_1st) from the context pool storage 108 into two local buffer units of the local buffer 112. When the bin decode circuit 1300 is controlled to operate under a two-bin-one-cycle CABAC decoding mode (en_2bin=1) and the decoding of the first bin and decoding of the second bin select different context sources (sel_2nd=1), the multiplexer 1318 controlled by the context index ctx_inc may load all of the set of multiple contexts (P0_1st, P1_1st), the set of multiple contexts (P0_2nd_c0, P1_2nd_c0), and the set of multiple contexts (P0_2nd_c1, P1_2nd_c1) from the context pool storage 108 into six local buffer units of the local buffer 112. When the bin decode circuit 1300 is controlled to operate under a one-bin-one-cycle CABAC decoding mode (en_2bin=0), the multiplexer 1318 controlled by the context index ctx_inc may only load the set of multiple contexts (P0_1st, P1_1st) from the context pool storage 108 into two local buffer units of the local buffer 112.

Figure 14:
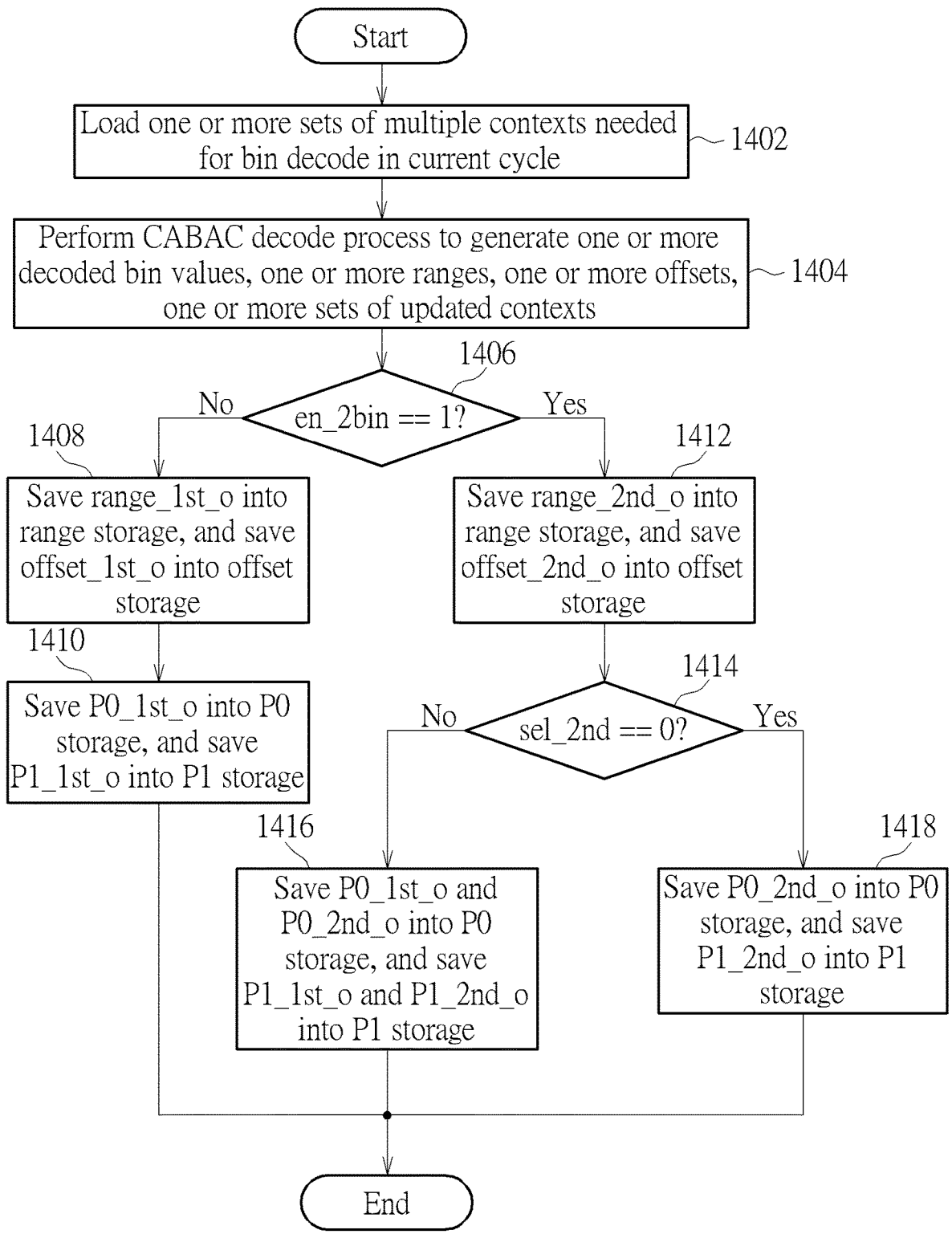
FIG. 14 is a flowchart illustrating a CABAC decoding method according to an embodiment of the present invention.

FIG. 14 is a flowchart illustrating a CABAC decoding method according to an embodiment of the present invention. The CABAC decoding method may be employed by the CABAC decoder 100 shown in FIG. 1, where the bin decode circuit 104 may be implemented by the bin decode circuit 700 shown in FIG. 7 or the bin decode circuit 1300 shown in FIG. 13, and the context update circuit 106 may be implemented by the context update circuit 400 shown in FIG. 4 or the context update circuit 1000 shown in FIG. 10. Provided that the result is substantially the same, the steps are not required to be executed in the exact order shown in FIG. 14. At step 1402, the contexts needed for a CABAC decode process are loaded. For example, the number of contexts actually loaded from the context pool storage 108 may depend on whether decoding of two bins in one cycle (stage) is enabled, whether decoding of the first bin and decoding of the second bin select the same context sources, and/or whether the second bin's context selection depends on the bin value of the first bin. At step 1404, the CABAC decode process in one cycle (stage) may generate bin_val_1st, range_1st_0, offset_1st_o, P0_1st_o, P1_1st_o for an one-bin-one cycle mode, or may generate bin_val_1st, bin_val_2nd, range_1st_0, range_2nd_0, offset_1st_o, offset_2nd_o, P0_1st_o, P1_1st_o, P0_2nd_o, and P1_2nd_o for a multi-bin-one-cycle mode. At step 1408 or step 1412, the range recorded in the range storage 114 and the offset recorded in the offset storage 116 are updated. At steps 1410, step 1416, or step 1418, the contexts stored in the context pool storage 108 are updated. Since a person skilled in the art can readily understand details of steps shown in FIG. 14 after reading above paragraphs directed to the proposed CABAC decoder design, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A context-based adaptive binary arithmetic coding (CABAC) decoder comprising:
    a bin decode circuit, arranged to at least support decoding of multiple bins in one cycle, wherein the multiple bins comprise a first bin and a second bin, and the bin decode circuit generates a bin value of the first bin according to a first set of multiple contexts, a first range and a first offset, and generates one bin value of the second bin according to a second set of multiple contexts, a second range and a second offset, where each of the second range and the second offset depends on decoding of the first bin; and
    a context update circuit, arranged to update the first set of multiple contexts in response to the bin value of the first bin, to generate a first set of multiple updated contexts; and further arranged to update the second set of multiple contexts in response to said one bin value of the second bin, to generate a second set of multiple updated contexts, wherein the context update circuit comprises:
        a context update core circuit, arranged to:
            generate the first set of multiple updated contexts according to the first set of multiple contexts, the bin value of the first bin, and a first set of multiple adaptation rates; and
            generate the second set of multiple updated contexts according to the second set of multiple contexts, said one bin value of the second bin, and a second set of multiple adaptation rates;
        a first multiplexer circuit, having a first input port arranged to receive the first set of updated multiple contexts, a second input port arranged to receive a third set of multiple contexts, and a first output port arranged to output the second set of multiple contexts to the context update core circuit, wherein the first multiplexer circuit is arranged to couple the first output port to one of the first input port and the second input port; and
        a second multiplexer circuit, having a third input port arranged to receive the first set of multiple adaptation rates, a fourth input port arranged to receive a third set of multiple adaptation rates, and a second output port arranged to output the second set of multiple adaptation rates to the context update core circuit, wherein the second multiplexer circuit is arranged to couple the second output port to one of the third input port and the fourth input port.

2. The CABAC decoder of claim 1, wherein the context update core circuit comprises a plurality of individual processing circuits, and the plurality of individual processing circuits comprises a first processing circuit and a second processing circuit, the first processing circuit is dedicated to dealing with context update of the first set of multiple contexts, and the second processing circuit is dedicated to dealing with context update of the second set of multiple contexts.

3. The CABAC decoder of claim 1, wherein the context update core circuit is a shared processing circuit used to deal with context update of the first set of multiple contexts, and is reused to deal with context update of the second set of multiple contexts.

4. The CABAC decoder of claim 1, wherein the decoding of the first bin and decoding of the second bin select same context sources, the first multiplexer circuit couples the first output port to the first input port, and the second multiplexer circuit couples the second output port to the third input port.

5. The CABAC decoder of claim 4, further comprising:
a context pool storage;
wherein the first set of multiple contexts is set by stored contexts loaded from the context pool storage, and the context update core circuit is further arranged to write back the second set of multiple updated contexts into the context pool storage for updating the stored contexts in the context pool storage by the second set of multiple updated contexts.

6. The CABAC decoder of claim 4, further comprising:
a context pool storage;
wherein stored contexts are loaded from the context pool storage to set the first set of multiple contexts, and no stored contexts are loaded from the context pool storage to set the third set of multiple contexts.

7. The CABAC decoder of claim 1, wherein the decoding of the first bin and decoding of the second bin select different context sources, the first multiplexer circuit couples the first output port to the second input port, and the second multiplexer circuit couples the second output port to the fourth input port.

8. The CABAC decoder of claim 7, further comprising:
a context pool storage;
wherein the first set of multiple contexts is set by first stored contexts loaded from the context pool storage, the third set of multiple contexts is set by second stored contexts loaded from the context pool storage, and the context update core circuit is further arranged to write back the first set of multiple updated contexts into the context pool storage for updating the first stored contexts in the context pool storage, and write back the second set of multiple updated contexts into the context pool storage for updating the second stored contexts in the context pool storage.

9. The CABAC decoder of claim 1, wherein the context update circuit further comprises:
a third multiplexer circuit, having a fifth input port arranged to receive a fourth set of multiple contexts, a sixth input port arranged to receive a fifth set of multiple contexts, and a third output port arranged to output the third set of multiple contexts to the second input port of the first multiplexer circuit, wherein the third multiplexer circuit is arranged to couple the third output port to one of the fifth input port and the sixth input port; and
a fourth multiplexer circuit, having a seventh input port arranged to receive a fourth set of multiple adaptation rates, an eighth input port arranged to receive a fifth set of multiple adaptation rates, and a fourth output port arranged to output the third set of multiple adaptation rates to the fourth input port of the second multiplexer circuit, wherein the fourth multiplexer circuit is arranged to couple the fourth output port to one of the seventh input port and the eighth input port.

10. The CABAC decoder of claim 9, wherein a control signal of each of the third multiplexer circuit and the fourth multiplexer circuit is set based on the bin value of the first bin.

11. The CABAC decoder of claim 1, wherein the bin decode circuit comprises:
a bin decode core circuit, arranged to decode and generate the bin value of the first bin and said one bin value of the second bin; and
a third multiplexer circuit, having a fifth input port arranged to receive the first set of updated multiple contexts, a sixth input port arranged to receive the third set of multiple contexts, and a third output port arranged to output the second set of multiple contexts to the bin decode core circuit, wherein the third multiplexer circuit is arranged to couple the third output port to one of the fifth input port and the sixth input port.

12. The CABAC decoder of claim 11, wherein the bin decode core circuit comprises a plurality of individual processing circuits, and the plurality of individual processing circuits comprises a first processing circuit and a second processing circuit, the first processing circuit is dedicated to dealing with the decoding of the bin value of the first bin, and the second processing circuit is dedicated to dealing with decoding of said one bin value of the second bin.

13. The CABAC decoder of claim 11, wherein the bin decode core circuit is a shared processing circuit used to deal with the decoding of the bin value of the first bin, and is reused to deal with decoding of said one bin value of the second bin.

14. The CABAC decoder of claim 11, wherein a control signal of the third multiplexer circuit is set based on whether the decoding of the first bin and decoding of the second bin select same context sources.

15. The CABAC decoder of claim 11, wherein the bin decode circuit further comprises:
a fourth multiplexer circuit, having a seventh input port arranged to receive the first set of updated multiple contexts, an eighth input port arranged to receive a fourth set of multiple contexts, and a fourth output port arranged to output a fifth set of multiple contexts to the bin decode core circuit, wherein the fourth multiplexer circuit is arranged to couple the fourth output port to one of the seventh input port and the eighth input port, the bin decode core circuit is further arranged to decode and generate another bin value of the second bin according to the fifth set of multiple contexts; and
a fifth multiplexer circuit, having a ninth input port arranged to receive said one bin value of the second bin, a tenth input port arranged to receive said another bin value of the second bin, and a fifth output port arranged to output a bin value of the second bin, wherein the fifth multiplexer circuit is arranged to couple the fifth output port to one of the ninth input port and the tenth input port.

16. The CABAC decoder of claim 15, wherein a control signal of each of the third multiplexer circuit and the fourth multiplexer circuit is set based on whether the decoding of the first bin and decoding of the second bin select same context sources.

17. The CABAC decoder of claim 15, wherein a control signal of the fifth multiplexer circuit is set based on the bin value of the first bin.

18. The CABAC decoder of claim 1, wherein the bin decode circuit is further arranged to support decoding of only a single bin in one cycle.

19. A context-based adaptive binary arithmetic coding (CABAC) decoding method comprising:

performing, by a bin decode circuit, decoding of multiple bins in one cycle, wherein the multiple bins comprise a first bin and a second bin, and a bin value of the first bin is decoded according to a first set of multiple contexts, a first range and a first offset, and one bin value of the second bin is decoded according to a second set of multiple contexts, a second range and a second offset, where each of the second range and the second offset depends on decoding of the first bin;

updating the first set of multiple contexts in response to the bin value of the first bin, to generate a first set of multiple updated contexts, comprising:

generating the first set of multiple updated contexts according to the first set of multiple contexts, the bin value of the first bin, and a first set of multiple adaptation rates;

updating the second set of multiple contexts in response to the bin value of the second bin, to generate a second set of multiple updated contexts, comprising:

generating the second set of multiple updated contexts according to the second set of multiple contexts, said one bin value of the second bin, and a second set of multiple adaptation rates;

receiving the first set of updated multiple contexts and a third set of multiple contexts, and selecting and outputting one of the first set of updated multiple contexts and the third set of multiple contexts as the second set of multiple contexts; and receiving the first set of multiple adaptation rates and a third set of multiple adaptation rates, and selecting and outputting one of the first set of multiple adaptation rates and the third set of multiple adaptation rates as the second set of multiple adaptation rates.

* * * * *